United States Patent
Bekritsky et al.

(10) Patent No.: US 7,030,812 B2
(45) Date of Patent: Apr. 18, 2006

(54) WIRELESS CLOCK SYNCHRONIZATION

(75) Inventors: Benjamin J. Bekritsky, New York, NY (US); David Goren, Smithtown, NY (US); William Sakoda, East Setauket, NY (US); Raj Bridgelall, Mount Sinai, NY (US)

(73) Assignee: Symbol Technologies Inc., Holtsville, NY (US)

( * ) Notice: Subject to any disclaimer, the term of this patent is extended or adjusted under 35 U.S.C. 154(b) by 619 days.

(21) Appl. No.: 09/992,200

(22) Filed: Nov. 14, 2001

(65) Prior Publication Data

US 2002/0059535 A1 May 16, 2002

Related U.S. Application Data

(60) Provisional application No. 60/248,357, filed on Nov. 14, 2000, provisional application No. 60/270,254, filed on Feb. 20, 2001.

(51) Int. Cl.
*G01S 3/02* (2006.01)
(52) U.S. Cl. .................................. 342/387; 342/465
(58) Field of Classification Search ................ 342/387, 342/465
See application file for complete search history.

(56) References Cited

U.S. PATENT DOCUMENTS

| | | | |
|---|---|---|---|
| 3,848,254 A | 11/1974 | Drebinger et al. | |
| 4,799,062 A | 1/1989 | Sanderford, Jr. et al. | ... 342/450 |
| 5,119,104 A * | 6/1992 | Heller | ......................... 342/450 |
| 5,365,516 A | 11/1994 | Jandrell | |
| 5,469,409 A * | 11/1995 | Anderson et al. | ............. 368/10 |
| 5,525,081 A | 6/1996 | Mardesich et al. | |
| 5,526,357 A | 6/1996 | Jandrell | |
| 5,596,330 A | 1/1997 | Yokev et al. | |
| 5,717,406 A * | 2/1998 | Sanderford et al. | ......... 342/457 |
| 5,764,188 A | 6/1998 | Ghosh et al. | |

(Continued)

FOREIGN PATENT DOCUMENTS

EP 0748084 A1 11/1996

(Continued)

OTHER PUBLICATIONS

"IEEE Standard Part 11: Wireless Medium Access Control (MAC) and Physical Layer (PHY) Specification. (ISO/IEC 8802-11, ANSI/IEEE STD 802.11-1999) Chapter 7: Frame Formats" ISO/IEC 8802-11, ANSI/IEEE STD 802.11, Aug. 20, 1999 pp. 34-58, XP002206839 pp. 42-43, Paragraph 7.2.1.4 Figure 19.

(Continued)

*Primary Examiner*—Gregory C. Issing
(74) *Attorney, Agent, or Firm*—Baker Botts LLP; Manu J. Tejwani

(57) ABSTRACT

A system and method for synchronizing internal clocks of receiving stations of a locating system are described. A beacon transmits reference data packets at a known position. A first arrival time is compared to a second arrival time to determine a correlated arrival time data. The first arrival time is a time of reception of the reference data packets by a first receiving station, and the second arrival time is a time of reception of the reference data packets by a second receiving station. A linear polynomial fit is computed as a function of the correlated arrival time data and the first and second arrival times. Times of arrival of data packets at the first and second receiving stations is synchronized as a function of the linear polynomial fit.

15 Claims, 3 Drawing Sheets

U.S. PATENT DOCUMENTS

| | | | |
|---|---|---|---|
| 5,890,068 A | 3/1999 | Fattouche et al. | |
| 5,917,449 A | 6/1999 | Sanderford et al. | 342/457 |
| 6,121,926 A | 9/2000 | Belcher et al. | |
| 6,127,976 A | 10/2000 | Boyd et al. | |
| 6,150,921 A | 11/2000 | Werb et al. | |
| 6,184,829 B1 * | 2/2001 | Stilp | 342/387 |
| 6,268,723 B1 | 7/2001 | Hash et al. | |
| 6,308,428 B1 | 10/2001 | Creighton, III | |
| 6,317,082 B1 | 11/2001 | Bacon et al. | |
| 2001/0030625 A1 * | 10/2001 | Doles et al. | 342/387 |

FOREIGN PATENT DOCUMENTS

| | | |
|---|---|---|
| WO | WO 98/16849 | 4/1998 |
| WO | WO 98/52376 | 11/1998 |
| WO | WO 99/57826 | 11/1999 |
| WO | WO 99/67737 | 12/1999 |
| WO | WO 00/11590 A1 | 3/2000 |
| WO | WO 00/14561 | 3/2000 |
| WO | WO 00/23956 A1 | 4/2000 |
| WO | WO 00/46771 | 8/2000 |
| WO | WO 00/48016 | 8/2000 |
| WO | WO 00/52498 | 9/2000 |
| WO | WO 01/06401 A1 | 1/2001 |
| WO | WO 01/07928 A1 | 2/2001 |
| WO | WO 01/15070 A2 | 3/2001 |
| WO | WO 01/29574 A2 | 4/2001 |
| WO | WO 01/43419 A2 | 6/2001 |
| WO | WO 01/50299 A2 | 7/2001 |
| WO | WO 01/61465 A1 | 8/2001 |
| WO | WO 01/61883 A2 | 8/2001 |
| WO | WO 01/67043 | 9/2001 |
| WO | WO 01/67128 A2 | 9/2001 |
| WO | WO 01/67341 A1 | 9/2001 |
| WO | WO 01/74020 A1 | 10/2001 |
| WO | WO 01/82520 A2 | 11/2001 |

OTHER PUBLICATIONS

"IEEE Standard Part 11: Wireless Medium Access Control (MAC) and Physical Layer (PHY) Specification. (ISO/IEC 8802-11, ANSI/IEEE STD 802.11-1999) Chapter 9: MAC Sublayer Functional Description" ISO/IEC 8802-11, ANSI/IEEE STD 802.11, Aug. 20, 1999 pp. 70-97, XP002207974 pp. 70, Paragraph 9-p. 76, Paragraph 9.2.4.

"IEEE Standard Part 11: Wireless Medium Access Control (MAC) and Physical Layer (PHY) Specification. (ISO/IEC 8802-11, ANSI/IEEE STD 802.11-1999) Chapter 11: MAC Sublayer Management Entity" ISO/IEC 8802-11, ANSI/IEEE STD 802.11, Aug. 20, 1999 pp. 123-137, XP002207975 p. 125, Paragraph 11.2.2.4; Figures 67,68; Table 23.

"IEEE Standard Part 11: Wireless Medium Access Control (MAC) and Physical Layer (PHY) Specification. (ISO/IEC 8802-11, ANSI/IEEE STD 802.11-1999) Chapter 14: Frequency-Hopping Spread Spectrum (FHSS) PHY Specification for the 2.4 GHz . . . " ISO/IEC 8802-11, ANSI/IEEE STD 802.11, Aug. 20, 1999 pp. 148-194, XP002207976 pp. 157, Paragraph 14.3.3.2-p. 160, Paragraph 14.3.3.2.2; Figures 77,78.

"IEEE Standard Part 11: Wireless Medium Access Control (MAC) and Physical Layer (PHY) Specification. (ISO/IEC 8802-11, ANSI/IEEE STD 802.11-1999) Chapter 15: Direct Sequence Spread Spectrum (DSSS) PHY Specification for the 2.4 GHz Band . . . " ISO/IEC 8802-11, ANSI/IEEE STD 802.11, Aug. 20, 1999 pp. 195-223 XP002207977 pp. 223, Paragraph 15.4.8.4.

* cited by examiner

WIRELESS CLOCK SYNCHRONIZATION

REFERENCE TO RELATED APPLICATIONS

This application claims the benefit of U.S. Provisional Application Ser. No. 60/248,357, filed Nov. 14, 2000, and U.S. Provisional Application Ser. No. 60/270,254, filed Feb. 20, 2001, all of which are incorporated by reference herein in their entirety.

FIELD OF THE INVENTION

The present invention relates to a method and system for synchronizing the clocks of wireless devices. In particular, the present invention relates to synchronizing clocks of wireless receiving stations used to determine the location of mobile devices.

BACKGROUND OF THE INVENTION

The proliferation of wireless devices in the recent past has been exceptional, and includes communication and computing devices that are able to exchange data or voice signals amongst each other and/or with a central location. These devices communicate typically through radio waves, over dedicated frequencies or dedicated segments of the electromagnetic spectrum. The range of these radio communications varies, and repeaters, cellular towers, or other nodes of the device's network may be used to extend that range.

Some of these devices may be cellular telephones, but increasingly the devices have multiple functions, such as portable or hand held computers with wireless capabilities, e-mail sending and receiving devices, pagers, or two way radio communication devices. The signals sent by these devices may also be used to locate the device, and thus the person using the device. For example, cellular telephones could be modified to pinpoint the caller's location in case of emergency. In some cases, beacons or locator devices may have the specific function of keeping track of the location of personnel in dangerous situations, such as firemen or other rescue workers.

Various methods have been developed to determine the position of a device that transmits a radio signal. For example, triangulation can be used to locate a transmitter by using two or more directional receivers. The receivers however must be rather sophisticated, because they must be able to determine the bearing, or direction from which a radio signal arrives.

SUMMARY OF THE INVENTION

The present invention is a method and system of synchronizing internal clocks of receiving stations of a locating system. A beacon transmits reference data packets at a known position. A first arrival time is compared to a second arrival time to determine a correlated arrival time data. The first arrival time is a time of reception of the reference data packets by a first receiving station, and the second arrival time is a time of reception of the reference data packets by a second receiving station. A linear polynomial fit is computed as a function of the correlated arrival time data and the first and second arrival times. Times of arrival of data packets at the first and second receiving stations is synchronized as a function of the linear polynomial fit.

In another aspect, the invention is a method of locating a mobile device comprising synchronizing internal clocks of receiving stations, receiving a data packet from the mobile device at pairs of the receiving stations, determining a synchronized time of arrival of the data packet at each receiving station of the pairs, and computing a location of the mobile device using hyperbolic trilateration, based on the synchronized time of arrival.

DETAILED DESCRIPTION

The present invention is a method and system for synchronizing the internal clock of wireless devices. In many circumstances it is highly desirable to determine the location of a wireless device. This ability may be invaluable in emergency situations, where the user of the device has to be located. For example, it would be useful to locate a 911 caller using a cellular telephone even if the caller is incapacitated or cannot provide his location. In other cases, it may be useful to know the location of a wireless device, such as a Personal Digital Assistant that may be utilizing the IEEE 802.11, IEEE 802.11b, IEEE 802.11a, Bluetooth or any future standards related to wireless LAN (collectively, "the 802.11x network standards"), to provide location sensitive information to the device.

The key to precisely locating a device that may transmit a signal is to perform precise timing operations. One method that may be used to determine the location of a mobile unit is to perform hyperbolic trilateration. According to this scheme, timing information may be mapped to location information. The mobile device that is to be located sends out a packet, or a transmission containing information such as, for example data describing the identity of the transmitter. The packet is received by a number of receivers that have a known location. The location of the receivers may be fixed, or the receivers may be movable. If the receivers are movable, their position has to be known by the system.

The difference in time of arrival of the packet at any two of the receivers allows computation of a unique hyperbola in space, along which the mobile device is located. By considering the difference in arrival time of the packet at an additional pair of two receivers, a second hyperbola in space can be computed, along which the mobile unit is located. The intersection of the two hyperbolas so defined determines the exact location of the mobile device. An important feature of hyperbolic trilateration is that only the relative time of arrival of the packet at each pair of receiving stations needs to be known, and not the absolute time of arrival, or the actual time when the packets are received. Once the relative time of packet arrival at two receiving stations is known, the location of the transmitting mobile device can be determined.

Figure 1:
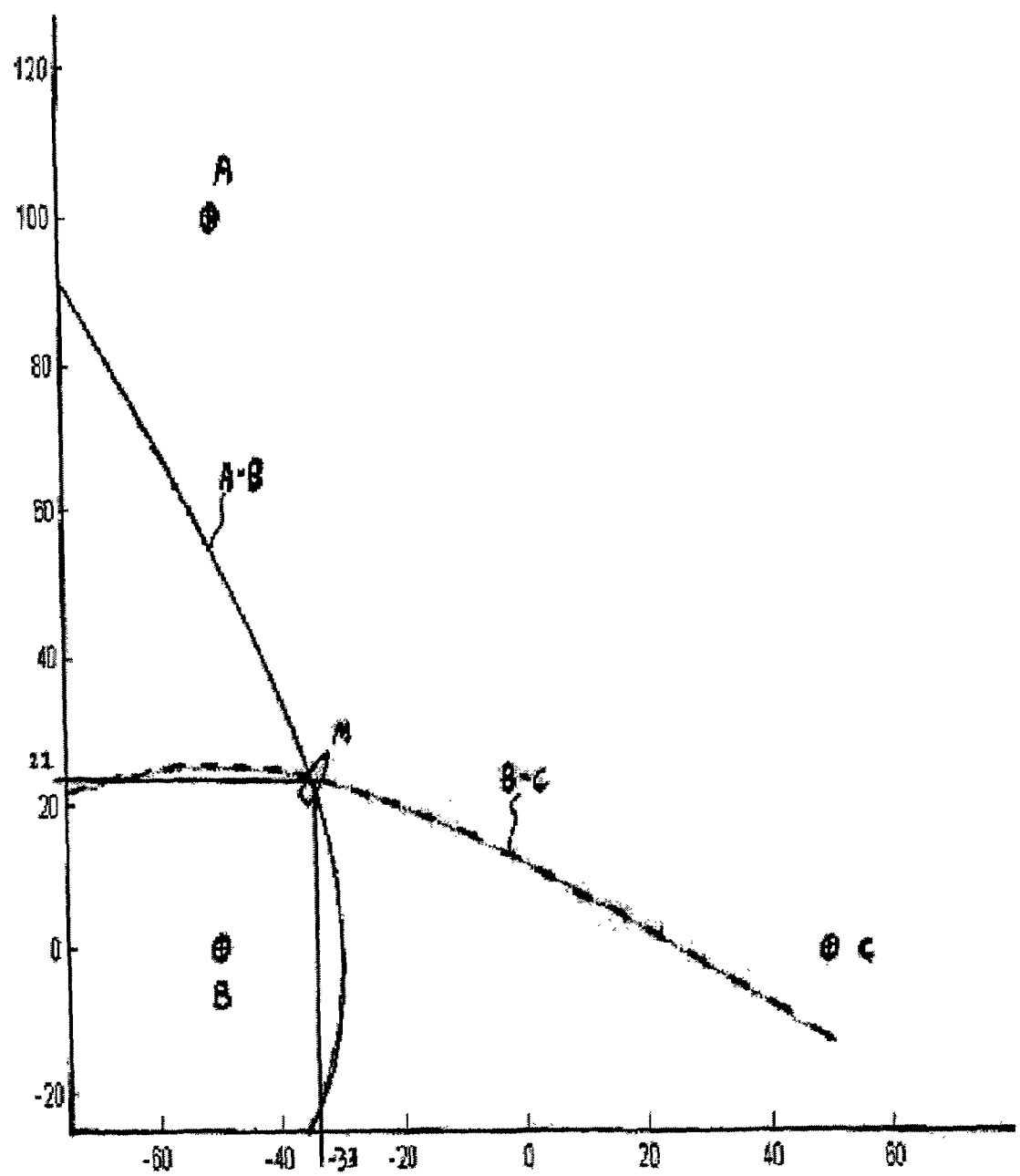
FIG. 1 illustrates a plot showing an intersection of hyperbolas used to determine the position of a mobile wireless device according to an embodiment of the present invention.

FIG. 1 shows a graphical representation of the method described above. A mobile device M transmits a packet of data that can be received by receiving stations A, B and C. The packet is received in turn by at least two pairs of receiving stations, for example pairs A, B and B, C. From each pair is computed an hyperbola along which the mobile device is located, such as hyperbolas A-B and B-C. Each point along those hyperbolas corresponds to a set of location coordinates, as shown in FIG. 1. The intersection of the two hyperbolas defines the position of the mobile device. In this example, the mobile device is located at −33 units along the X coordinate and 22 units along the Y coordinate.

In the locating system according to the present invention, each receiver is placed at a distinct location, with a clock that runs independently from the clocks of the other receiving stations. Because the clocks cannot be made completely identical, each clock has a distinct although very similar frequency, and its own random start time. To accurately determine the location of the moving device, the clocks at all receiving stations must be synchronized. If the receiving stations are at the same location, or are relatively close to each other, the required synchronization may be achieved by wiring the clocks together. However, if the receiving stations are at separate outdoors locations, it is cost prohibitive to wire the receivers together.

Figure 2:
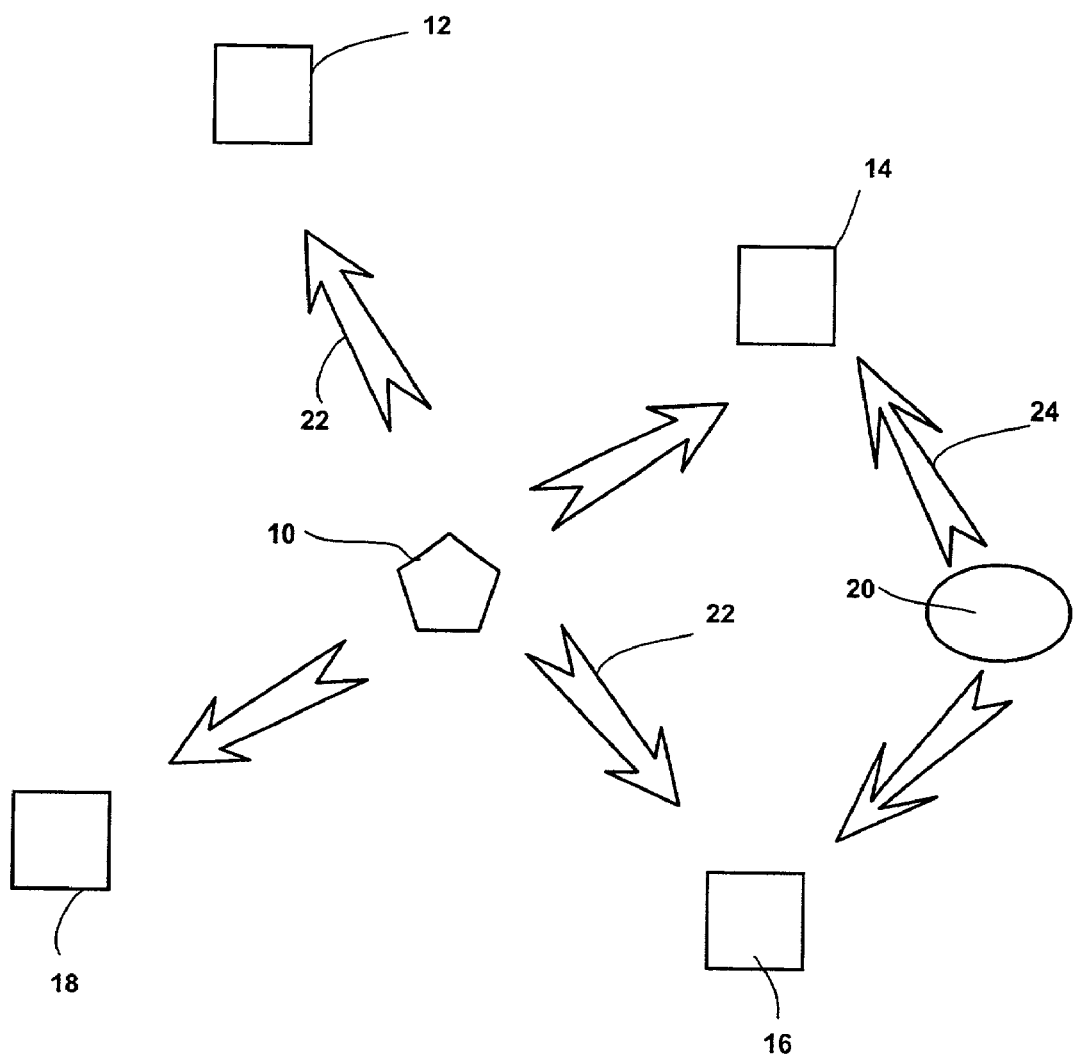
FIG. 2 shows an exemplary layout of transmitting and receiving wireless devices according to one embodiment of the present invention.

Embodiments of the present invention provide a method and system to synchronize the clocks of receiving stations that cannot practically be wired together. In one embodiment, a beacon is provided at a fixed, known location close to the geographical center point of the receiving stations. As shown in FIG. 2, the beacon 10 is centrally located relative to the receiving stations 12, 14, 16 and 18. The entire system is designed to locate a moving transmitting device 20. Although only one moving device 20 is shown, the system may be applied to locate more than one device.

Beacon 10 continuously transmits reference packets 22 of data that are received by each receiving unit 12–18. Such reference packets 22 may be created based on an 802.11x network standard and transmitted by access points fixed in pre-determined locations within that network. Each receiving unit time-stamps the packets as they arrive. In an idealized condition where the beacon 10 is located equidistant from pairs of receiving stations, for example stations 14 and 16, and where the clocks of those receiving stations are identical, the time difference of arrival (TDOA) of the packet at those receivers would be zero, because each of the two receivers would receive the packet at exactly the same time, according to its internal clock. In practice, even if receiving stations 14, 16 were exactly equidistant from beacon 10, TDOA would not be zero if the two clocks are not synchronized.

In synchronizing the clocks of all receiving stations according to the invention, the TDOA computed from the packets received from beacon 10 is forced to be equal to zero. To synchronize the clocks, the TDOA to all the receiver stations 12–18 is forced to be zero, even though the beacon 10 may not be equidistant from all receiving stations. Since the expected value of the TDOA is constant, because beacon 10 and receiving stations 12–18 do not move relative to one another, the inaccuracy due to forcing the TDOA to be zero is not large, and may be compensated for later in the computations according to the invention.

According to one exemplary embodiment of the present invention, the TDOA between two receivers A and B, which for example may be receiving stations 14 and 16, is computed by subtracting the timestamp from the clock of station B from the timestamp of the clock of station A. In other words, $TDOA_{A/B}=t_B-t_A$. In the case where beacon 10 is equidistant to all receivers, the difference in time of arrival would be zero, and $TDOA_{A/B}=0$. As a first step, this is assumed to be true. If the time stamps for a series of packets received by any two receivers were correlated against each other, while using perfectly synchronized clocks, the graph of time stamps from receiver A against the time stamps of receiver B would be a straight line with a slope of 1. For example, if the arrival times indicated by clock A were plotted on the y axis and arrival times indicated by clock B were plotted on the x axis, the equation for the straight line would be y−x=0, or y=x.

However, as explained above, the clocks of each one of receiving stations 12–18 are independent, and thus have slightly different frequencies and start times. The graph of the arrival times in practice is therefore never a straight line of slope 1. Instead, the equation for the line is y=mx+b. In the equation, m is the slope of the line, and b is the y intercept. The slope of the line is a function of the difference in the frequencies of the two clocks being considered, while they intercept is a function of the difference between the random clock start times of the two receivers. According to the embodiment of the present invention, a linear polynomial fit is used to determine the appropriate slope and y intercept from the data. The linear polynomial fit may be determined using a least-squares methodology.

If the clocks from the pairs of receiving stations A and B were perfectly synchronized, the slopes m would always equal 1, and the intercept b would always equal 0. In practice, the slopes and intercepts are continuously computed and updated according to the exemplary embodiment of the present invention. In this embodiment, the clock of one of the receiving stations is used as a reference clock, and all the clocks of the other receiving stations are corrected to match the frequency and start time of the reference clock. The reference clock according to the embodiment of the present invention may be chosen arbitrarily among the receiving stations, since only the relative times of arrival of data packets are important, not the absolute times.

Once the polynomial coefficients for the slope and y intercept according to the present invention are determined, the non-zero TDOA for pairs of receiving stations are compensated for. The known difference in distance between each of the receiving stations 12–18 and the beacon 10 is used to determine the bias, or the correction factor applied to the actual TDOA between sets of two receiving stations, and the expected TDOA that is computed from the known location of the beacon 10 and receivers 12–18.

Once the correction steps are taken according to the invention, every one of the clocks has three numbers associated with it, used to synchronize the clocks. Each clock has a slope m that generally will have a value different from 1 due to the frequency offset, a y intercept b that is determined from the random start times of the clocks, and a bias due to the different distances to each of the receiving stations 12–18.

When a packet 24 sent by mobile device 20 is received by one of the receiving stations 12–18, it is time stamped by the clock of the receiving station. The time stamp is then adjusted to compensate for frequency offset and the random start time of the internal clock. The TDOA between pairs of receiving stations is then calculated using the formula $TDOA_{A/B}=t_A-t_B$, using the adjusted times of reception of the packet coming from the mobile device 20. After the $TDOA_{A/B}$ is determined, the bias is added, to compensate for the nonzero TDOA associated with the calculations of m and b that were carried out in the clock synchronization step. When the TDOA for at least two pairs of receiving stations is computed, the location of mobile device 20 can be determined using hyperbolic trilateration.

Figure 3:
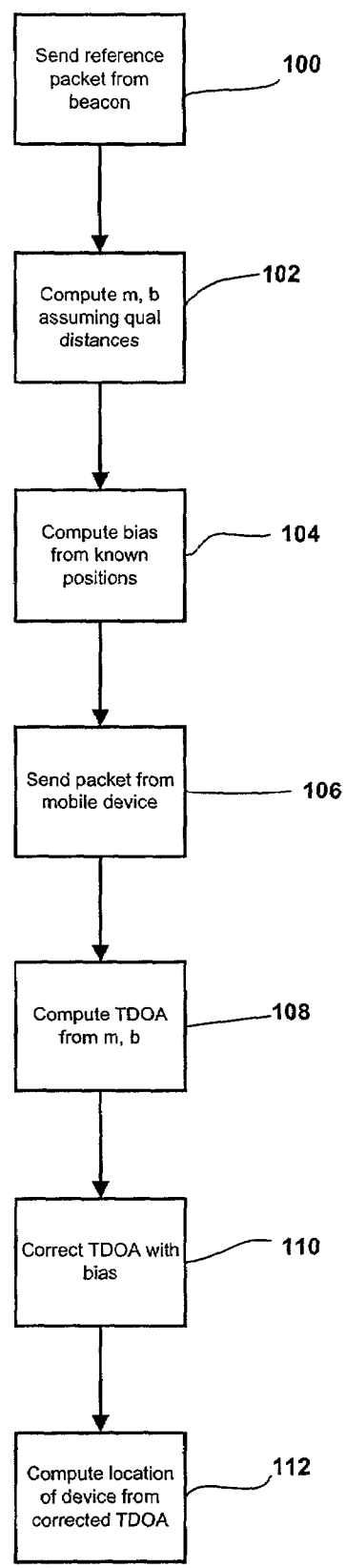
FIG. 3 shows an embodiment of the method for synchronizing the clocks of receiving stations used to locate a mobile device, according to the present invention.

FIG. 3 shows a flow chart describing the method, according to an embodiment of the present invention, used to synchronize the clocks of the receiving stations and to determine the position of a mobile device. The method will be described with reference to the components shown in FIG. 2, although the method may be applied to other configurations with different numbers of receiving stations, moving devices and beacons. In step 100, reference packets 22 are sent out from beacon 10, and are received by receiving stations 12–18. As described above, in step 102 the slope m and they intercept b are computed for each of the receiving stations, assuming equal distances between the beacon 10 and each of the receiving stations 12–18.

Once the slope and y intercept are computed, a bias is computed for each receiving station in step 104. The bias is computed from the known location of the beacon 10 and the receiving stations 12–18, as described above. Steps 100, 102 and 104 are part of the synchronization step, used to calibrate the clocks of the receiving stations so that localization of the moving device 20 can be accomplished. Steps 106 through 112 are directed to localizing the moving device 20, after the clocks have been synchronized In step 106 a packet 24 is sent from the movable device 20, and is received by at least two pairs of receiving stations. The TDOA for pairs of receiving stations is computed in step 108 utilizing the slope and y intercept computed previously to synchronize the internal clocks. In step 110 the TDOA's computed are corrected using the bias values computed in step 104, and the corrected values of TDOA for pairs of receiving stations are used to compute hyperbolas along which the moving device 20 is located. The hyperbolas computed for at least two pairs of receiving stations may then be used in step 112 to locate the moving device 20, as explained above.

The present invention has been described with reference to an embodiment having one mobile device and four fixed receiving stations. However, other embodiments may be devised having additional moving devices and/or additional beacons and/or additional or fewer receiving stations. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A method for synchronizing internal clocks of a first pair of first and second receiving stations A and B of a system, comprising the steps of:
    transmitting a series of reference data packets from a beacon at a known position proximate to a geographical center point of a first pair of first and second receiving stations A and B;
    assuming that the beacon is at the geographical center point;
    correlating first arrival times $t_A$, and second arrival times $t_A$, by plotting times $t_A$ and $t_B$ against each other for the series of reference data packets, a first arrival time $t_A$ being a time of reception of a particular reference data packet by receiving station A, a corresponding second arrival time $t_B$ being a time of reception of the particular reference data packet by receiving station B;
    computing a linear polynomial fit $t_B = m\, t_A + b$, where slope m is function of the difference in the frequencies of the internal clocks of the receiving stations A and B and y-intercept b is the offset due to different start times of the internal clocks of the receiving stations A and B;
    determining a bias for the internal clocks using known difference in distance between the beacon and the receiving stations A and B,
    synchronizing the internal clocks of the receiving stations A and B according to the slope m, the offset b and the bias.

2. The method according to claim 1, further comprising repeating the correlating and computing steps for third and fourth receiving stations to determine a further slope, a further y-intercept and a further bias for the third and fourth receiving stations.

3. The method according to claim 2, further comprising repeating the correlating and computing steps for a third receiving station in conjunction with the first receiving station A to determine a further slope, a further y-intercept and a further bias for the first and third receiving stations.

4. The method according to claim 3, further comprising the step of: correcting an arrival time difference between the first and second receiving stations and the third and fourth receiving stations as a function of an arrival time of a first data packet sent by a mobile device and a slope, a y-intercept and a bias computed for first and second pairs of the receiving stations, each of the first and second pairs including any two stations of the first, second, third and fourth receiving stations, the first pair including at least one receiving station which is not included in the second pair.

5. The method according to claim 1, further comprising the step of: repeating the transmitting, comparing and computing steps to update synchronization of the internal clocks of the receiving stations at a predetermined rate.

6. A method for determining a location of a mobile device, comprising the steps of:
    synchronizing internal clocks of receiving stations according to the method of claim 1;
    receiving a data packet from the mobile device by first and second receiving stations of the receiving stations;
    determining a synchronized arrival time of the data packet at the first and second receiving stations;
    calculating an arrival time difference between the first and second receiving stations; and computing the location of the mobile device, using a hyperbolic trilateration, as a function of the synchronized arrival time.

7. The method according to claim 6, further comprising the step of: determining a corresponding synchronized arrival time for at least first and second pairs of the receiving stations, each of the first and second pairs including any two of the first receiving station, the second receiving station, a third receiving station and a fourth receiving station, the first pair including at least one receiving station which is not included in the second pair.

8. The method according to claim 6, further comprising the step of: determining a corresponding synchronized arrival time for at least first, second and third pairs of the receiving stations, the first, second and third pairs of the receiving stations including any two of the first receiving station, the second receiving station, the third receiving station, the fourth receiving station, a fifth receiving station and a sixth receiving station, the first pair including at least one receiving station which is not included in the second and third pairs, the second pair including at least one receiving station which is not included in the third pair.

9. The method according to claim 6, wherein the synchronizing step includes the sub steps: transmitting a reference data packet from a beacon at a known position; comparing a first arrival time and a second arrival time to determine a correlated arrival time data, the first arrival time being a time of reception of the reference data packet at the first receiving station, the second arrival time being a time of reception of the reference data packet by the second receiving station; computing a linear polynomial fit as a function of the correlated arrival time data and the first and second arrival times; and synchronizing arrival time of the reference data packet at the first and second receiving stations as a function of the linear polynomial fit.

10. A system for synchronizing internal clocks of a mobile device locating network, comprising:

receiving stations having the internal clocks;

a processor connected to the receiving stations;

and a beacon adapted for transmitting to the receiving stations a series of reference data packets, the beacon having a known location proximate to a geographical center point of the receiving stations, wherein each of the receiving stations is adapted to forward arrival times of the series of reference data packets to the processor, wherein the processor is adapted to compute:

a linear polynomial fit $t_B = m\, t_A + b$ for a pair of receiving stations A and B, where $t_A$ and $t_B$ are the reception times of the series of reference data packets at receiving stations A and B, respectively, where slope m is function of the difference in the frequencies of the internal clocks of the receiving stations A and B, and where y-intercept b is the offset due to different start times of the internal clocks of the receiving stations A and B; and a bias for the internal clocks of receiving stations A and B using known difference in distance between the beacon and the receiving stations A and B; and wherein the processor is further adapted to synchronize the internal clocks of the receiving stations A and B according to the slope m, the offset b and the bias.

11. The system according to claim 10, wherein the receiving stations includes are divided in pairs and wherein at least two pairs are used to locate the mobile device.

12. The system according to claim 10, wherein the processor receives first and second arrival times, the first arrival time being a time of reception of the reference data packet by a first receiving station of the receiving stations, the second arrival time being a time of reception of the reference data packet by a second receiving station of the receiving stations, wherein the processor comparing the first arrival time against the second arrival time to determine a correlated arrival time data, wherein the processor computes a slope and a intercept as a function of the correlated arrival time data and the first and second arrival times, assuming equal distances between the beacon and the first and second receiving stations, and wherein the processor computes a bias of the correlated arrival time data from known distance differences between the beacon and the first and second receiving stations.

13. A method of synchronizing internal clocks of receiving stations of a locating system, comprising the steps of:

for a first pair of receiving stations A and B in the location system, transmitting a series of reference data packets from a beacon at a known position;

assuming that the beacon is at the geographical center point between receiving stations A and B;

correlating first arrival times $t_A$ and second arrival times $t_B$ by plotting times $t_A$ and $t_B$ against each other for the series of reference data packets, where a first arrival time $t_A$ is a time of reception of the a particular reference data packet by the receiving station A, and corresponding second arrival time $t_B$ is a time of reception of the particular reference data packet by the receiving station B, computing a linear polynomial fit $t_B = m\, t_A + b$, where slope m is function of the difference in the frequencies of the internal clocks of the first and second receiving stations and y-intercept b is the offset due to different start times of the internal clocks of the first and second receiving stations;

determining a bias for the internal clocks using known difference in distance between the beacon and the first and second receiving stations, synchronizing the internal clocks for the first pair of receiving stations A and B according to the slope m, the offset b and the bias; and repeating the preceding steps for a second pair of receiving stations in the locating system.

14. The method according to claim 13, wherein a first one of the receiving stations is included in both the first and second pairs of receiving stations.

15. The method according to claim 13, wherein the first pair of receiving stations includes first and second receiving stations and the second pair of receiving stations includes third and fourth receiving stations.

* * * * *